United States Patent
Kajiwara et al.

(10) Patent No.: US 10,305,117 B2
(45) Date of Patent: May 28, 2019

(54) CARBON FIBER NONWOVEN FABRIC, PRODUCTION METHOD FOR CARBON FIBER NONWOVEN FABRIC, AND NONWOVEN FABRIC OF CARBON FIBER PRECURSOR FIBERS

(71) Applicant: TORAY Industries, Inc., Tokyo (JP)

(72) Inventors: Kentaro Kajiwara, Otsu (JP); Satoru Shimoyama, Otsu (JP); Tomoyuki Horiguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 250 days.

(21) Appl. No.: 15/107,986

(22) PCT Filed: Dec. 10, 2014

(86) PCT No.: PCT/JP2014/082724
§ 371 (c)(1),
(2) Date: Jun. 24, 2016

(87) PCT Pub. No.: WO2015/098530
PCT Pub. Date: Jul. 2, 2015

(65) Prior Publication Data
US 2016/0322646 A1    Nov. 3, 2016

(30) Foreign Application Priority Data

Dec. 27, 2013 (JP) ................................ 2013-271331
Dec. 27, 2013 (JP) ................................ 2013-271332
Feb. 25, 2014 (JP) ................................ 2014-033704

(51) Int. Cl.
*H01M 4/96* (2006.01)
*H01M 4/86* (2006.01)
(Continued)

(52) U.S. Cl.
CPC ............ *H01M 4/96* (2013.01); *D04H 1/4242* (2013.01); *H01M 4/8626* (2013.01);
(Continued)

(58) Field of Classification Search
CPC .... H01M 4/96; H01M 4/8807; H01M 4/8626; H01M 8/0234; H01M 2008/1095;
(Continued)

(56) References Cited

U.S. PATENT DOCUMENTS 5,648,027 A  7/1997 Tajiri et al.
5,648,184 A  7/1997 Inoue et al.
(Continued)

FOREIGN PATENT DOCUMENTS

JP      8-287923 A     11/1996
JP      2003-064566 A   3/2003
WO     WO 2009/110467 A1  9/2009

OTHER PUBLICATIONS

Machine translation of JP2003-64566 (Year: 2003).*
(Continued)

*Primary Examiner* — Lisa S Park
(74) *Attorney, Agent, or Firm* — Birch, Stewart, Kolasch & Birch, LLP

(57) ABSTRACT

An object of the present invention is to provide a carbon fiber nonwoven fabric which has excellent electrical conductivity and thermal conductivity as an electrode base material for a polymer electrolyte fuel cell and which is useful as a base material excellent in gas diffusibility and drainage performance. The present invention provides a carbon fiber nonwoven fabric on a surface of which a plurality of non-through pores each having an opening area larger than the average pore area of the carbon fiber nonwoven fabric are dispersively formed, the carbon fiber nonwoven fabric having no broken fibers observed on the
(Continued)

peripheral edge portions of the non-through pores in plane view.

9 Claims, 1 Drawing Sheet

(51) Int. Cl.
    *H01M 4/88*     (2006.01)
    *D04H 1/4242*     (2012.01)
    *H01M 8/0234*     (2016.01)
    *H01M 8/1018*     (2016.01)

(52) U.S. Cl.
    CPC ....... *H01M 4/8807* (2013.01); *H01M 8/0234* (2013.01); *H01M 2008/1095* (2013.01); *H01M 2250/20* (2013.01); *Y02P 70/56* (2015.11); *Y02T 90/32* (2013.01)

(58) Field of Classification Search
    CPC .. H01M 2250/20; D04H 1/4242; Y02T 90/32; Y02P 70/56
    See application file for complete search history.

(56) References Cited

U.S. PATENT DOCUMENTS

| | | | |
|---|---|---|---|
| 2002/0045089 A1* | 4/2002 | Kawahara | H01M 4/8605 429/450 |
| 2003/0138689 A1* | 7/2003 | Koschany | H01M 4/8626 429/510 |
| 2006/0166075 A1 | 7/2006 | Inoue et al. | |
| 2008/0280202 A1* | 11/2008 | Yen | H01B 1/24 429/210 |
| 2012/0251925 A1* | 10/2012 | Sasaki | D01D 5/0038 429/530 |

OTHER PUBLICATIONS

Supplementary European Search Report, dated Mar. 31, 2017, for European Application 14874369.3.
International Search Report (PCT/ISA/210) issued in PCT/JP2014/082724, dated Mar. 10, 2015.
Written Opinion (PCT/ISA/237) issued in PCT/JP2014/082724, dated Mar. 10, 2015.

* cited by examiner

CARBON FIBER NONWOVEN FABRIC, PRODUCTION METHOD FOR CARBON FIBER NONWOVEN FABRIC, AND NONWOVEN FABRIC OF CARBON FIBER PRECURSOR FIBERS

TECHNICAL FIELD

The present invention relates to a carbon fiber nonwoven fabric which is suitably used in a gas diffusion electrode for a fuel cell, particularly a polymer electrolyte fuel cell; a method for producing a carbon fiber nonwoven fabric; and a carbon fiber precursor fiber nonwoven fabric which is used for producing the carbon fiber nonwoven fabric.

BACKGROUND ART

Among fuel cell systems which generate power by reacting a fuel with an oxidizer, particularly polymer electrolyte fuel cells are used in power supplies for automobiles that run by means of electric motors, and household cogeneration systems because they are capable of generating power at a relatively low temperature of about 100° C. and have a high power density.

Usually, the polymer electrolyte fuel cell includes a fuel gas containing hydrogen and an oxidizer gas containing oxygen, the fuel gas being isolated from the oxidizer gas by an electrolyte membrane. The side to which the fuel gas is fed is referred to as an anode side, and the side to which the oxidizer gas is fed is referred to as a cathode side. The fuel gas fed to a groove of a separator on the anode side diffuses into a gas diffusion electrode that is in contact with the separator, and the fuel gas is separated into electrons and protons at an anode catalyst layer arranged on the other surface (surface opposite to the side that is in contact with the separator) of the gas diffusion electrode. Electrons are connected to a load (device) outside the fuel cell through carbon particles in the catalyst layer and carbon fibers which form the gas diffusion electrode, so that a direct current can be extracted. The electrons move to the cathode catalyst layer through the gas diffusion electrode as a cathode, and protons generated at the anode catalyst layer move to the cathode catalyst layer through the electrolyte membrane. The oxidizer gas containing oxygen is fed to a groove of a separator on the cathode side, and diffuses into the gas diffusion electrode that is in contact with the separator, and the oxidizer gas generates water together with protons and electrons at a cathode catalyst layer arranged on the other surface of the gas diffusion electrode. The generated water moves to the groove of the separator on the cathode side through the gas diffusion electrode from the catalyst layer, and passes through the groove of the separator to be drained outside the fuel cell.

In the polymer electrolyte fuel cell, when the gas diffusion electrode is densified for obtaining electrical conductivity and thermal conductivity, diffusion of hydrogen and oxygen necessary for a reaction may become insufficient. In addition, it may be unable to obtain high power generation efficiency due to occurrence of so called flooding in which water generated in the reaction fills voids in the catalyst layer and the gas diffusion electrode to prevent transportation of hydrogen and oxygen. On the other hand, when ionomers in the electrolyte membrane and the catalyst layer are not sufficiently humidified, and thus drying is accelerated to cause so called drying-out, it may be unable to obtain high power generation efficiency. In view of these problems, an attempt has been made to improve drainage of water by, for example, a method in which a gas diffusion carbon fiber nonwoven fabric is subjected to a hydrophobic treatment with a fluororesin etc., and a method in which a micropore layer (hereinafter, referred to as a microporous layer) formed of a fluororesin and electrically conductive particles is formed on a gas diffusion electrode, but the effect thereof is not sufficient, and further improvement is desired.

For example, Patent Documents 1 and 2 disclose a technique in which a carbon paper provided with pores each having an opening on the channel side is used as a gas diffusion electrode to smoothly drain generated water through the pores.

Patent Documents 2 and 3 disclose a technique in which non-through pores having a depth equivalent to 20 to 80% of the thickness of a gas diffusion carbon fiber nonwoven fabric are formed in the gas diffusion carbon fiber nonwoven fabric by laser processing to secure both drainage of generated water and moisture retainability of ionomers in an electrolyte membrane and a catalyst layer.

PRIOR ART DOCUMENTS

Patent Documents

Patent Document 1: Japanese Patent Laid-open Publication No. 8-111226
Patent Document 2: Japanese Patent Laid-open Publication No. 2009-211928
Patent Document 3: Japanese Patent Laid-open Publication No. 2011-96385

SUMMARY OF THE INVENTION

Problems to be Solved by the Invention

Patent Document 1 describes formation of through pores in the thickness direction of a carbon fiber nonwoven fabric as a preferred aspect. This technique has an effect of suppressing flooding, but still has the problem of drying-out caused by, for example, drying of ionomers in an electrolyte membrane and a catalyst layer.

Patent Documents 2 and 3 disclose a technique in which non-through pores are formed in a gas diffusion electrode by a laser or machine processing. These non-through pores facilitate suppression of drying of ionomers in an electrolyte membrane and a catalyst layer as compared to through pores, but cannot prevent deterioration of moisture retainability.

Solutions to the Problems

For solving the problems described above, the present invention provides a carbon fiber nonwoven fabric on a surface of which a plurality of non-through pores each having an opening area larger than the average pore area of the carbon fiber nonwoven fabric are dispersively formed, the carbon fiber nonwoven fabric having no broken fibers observed on the peripheral edge portions of the non-through pores.

Effects of the Invention

By using a carbon fiber nonwoven fabric of the present invention in a gas diffusion electrode, a fuel cell can be prepared in which suppression of flooding by, for example, drainage from a gas diffusion electrode and suppression of drying-out by, for example, moisture retention of ionomers in an electrolyte membrane and a catalyst layer are both achieved at a high level.

EMBODIMENTS OF THE INVENTION

<Carbon Fiber Nonwoven Fabric>

Figure 2:
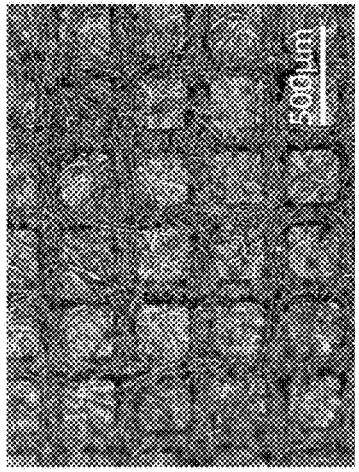
FIG. 2 is an optical microscope photograph of a surface of a carbon fiber nonwoven fabric of the present invention prepared in Example 2.

Hereinafter, a case will be described as an example where a carbon fiber nonwoven fabric of the present invention is used as a gas diffusion electrode for a polymer electrolyte fuel cell.

In the present invention, the carbon fiber nonwoven fabric is a web or a sheet formed of carbon fibers. The carbon fiber is one obtained by heating a carbon fiber precursor fiber under an inert gas atmosphere to be carbonized, and the carbon fiber nonwoven fabric is one obtained by heating a carbon fiber precursor fiber nonwoven fabric under an inert gas atmosphere to be carbonized. The carbon fiber precursor fiber will be described later. As the web, for example, a dry parallel laid web or cross laid web, an air laid web, a wet web made by a papermaking process, a spunbond web made by an extrusion method, a melt-blown web or a web made by electrospinning can be used. As the sheet, for example, a sheet obtained by mechanically entangling the webs, a sheet obtained by heating and welding the webs, or a sheet obtained by bonding the webs with a binder can be used.

Preferably, the carbon fiber nonwoven fabric of the present invention is formed of carbon fibers having a fiber length of more than 20 mm. When the fiber length is more than 20 mm, exposure of fiber ends at the peripheral edge portions of non-through pores is reduced, so that moisture retainability of the inside of the carbon fiber nonwoven fabric can be improved as described later, and fibers are easily oriented in the thickness direction of the non-through pores, so that electrical conductivity in the thickness direction can be improved. The fiber length of the carbon fibers is more preferably more than 30 mm. The upper limit of the fiber length is not particularly limited, but generally, it is preferably 100 mm or less. In the present invention, the fiber length means a number average fiber length.

As the fiber diameter of carbon fibers decreases, the apparent density is apt to increase, so that a carbon fiber nonwoven fabric excellent in electrical conductivity and thermal conductivity is obtained, but the average pore diameter of the carbon fiber nonwoven fabric tends to decrease, leading to deterioration of drainage performance and gas diffusibility. Accordingly, it is preferable that the fiber diameter of the carbon fibers is appropriately determined according to a use of the carbon fiber nonwoven fabric, and when the carbon fiber nonwoven fabric is used in a general gas diffusion electrode, the fiber diameter of the carbon fibers is preferably 3 to 30 μm, more preferably 5 to 20 μm.

When a carbide is deposited as a binder at the contact point between carbon fibers in the carbon fiber nonwoven fabric, the contact area at the contact point between carbon fibers increases, so that excellent electrical conductivity and thermal conductivity are achieved. Examples of the method for adding such a binder include a method in which a carbon fiber nonwoven fabric after carbonization is impregnated or sprayed with a binder solution, and heat-treated again under an inert gas atmosphere to carbonize a binder. Here, as the binder, thermosetting resins such as a phenol resin, an epoxy resin, a melamine resin and a furan resin can be used, and among them, a phenol resin having a high carbonization yield is especially preferable. A method is also preferable in which a thermoplastic resin is mixed in a carbon fiber precursor nonwoven fabric as described later.

The average pore diameter of the carbon fiber nonwoven fabric of the present invention is preferably 40 μm or more, more preferably 45 μm or more, further preferably 50 μm or more. The upper limit thereof is not particularly limited, but it is preferably 100 μm or less, more preferably 80 μm or less. When the average pore diameter is 40 μm or more, high performance is achieved in gas diffusion and drainage. When the average pore diameter is 100 μm or less, there is the advantage that drying-out is easily prevented. The average pore diameter of the carbon fiber nonwoven fabric of the present invention is a value measured by a mercury press-in method. This can be measured using, for example, Pore-Master (manufactured by Quantachrome Instruments), and in the present invention, a value is calculated while the surface tension a of mercury is set to 480 dyn/cm and the contact angle between mercury and the carbon fiber nonwoven fabric is set to 140°.

Since the size of the fuel cell increases as the thickness of the carbon fiber nonwoven fabric increases, the carbon fiber nonwoven fabric is preferably thin as long as it performs its functions, and the thickness thereof is generally about 30 μm to 500 μm. In the present invention, the thickness of the carbon fiber nonwoven fabric is preferably 400 μm or less, more preferably 300 μm or less, further preferably 250 μm or less. The thickness of the carbon fiber nonwoven fabric is more preferably 50 μm or more, further preferably 70 μm or more. When the thickness of the carbon fiber nonwoven fabric is 50 μm or more, gas diffusion in the in-plane direction is further improved, so that a gas can be more easily fed to a catalyst existing under a lib of a separator, resulting in further improvement of power generation performance at either a low temperature or a high temperature even when a microporous layer is placed. On the other hand, when the thickness of the carbon fiber nonwoven fabric is 400 μm or less, a gas diffusion path and a drainage path become shorter, and electrical conductivity and thermal conductivity can be improved, resulting in further improvement of power generation performance at either a high temperature or a low temperature. Here, the thickness of the carbon fiber nonwoven fabric is a value measured while a portion with an area of ϕ5 mm or more is compressed at a contact pressure of 0.15 MPa.

The basis weight of the carbon fiber nonwoven fabric of the present invention is not particularly limited, but preferably 15 g/m$^2$ or more, more preferably 20 g/m$^2$ or more. When the basis weight of the carbon fiber nonwoven fabric is 15 g/m$^2$ or more, mechanical strength is increased, so that conveyance performance in the production process can be improved. On the other hand, the basis weight is preferably 150 g/m$^2$ or less, more preferably 120 g/m$^2$ or less. When the basis weight is 150 g/m$^2$ or less, the gas permeability and diffusibility of the carbon fiber nonwoven fabric in the perpendicular-to-plane direction is further improved, so that the gas diffusibility of the resulting gas diffusion electrode in the perpendicular-to-plane direction is further enhanced, resulting in further improvement of power generation performance at either a high temperature or a low temperature. Here, the basis weight is a value obtained by dividing a weight by an area.

The apparent density is preferably 0.1 to 1.0 g/m$^3$. When the apparent density is 0.1 g/m$^3$ or more, electrical conductivity and thermal conductivity can be improved, and the structure is hard to be ruptured by a pressure which is applied at the time of using the carbon fiber nonwoven fabric in a fuel cell. When the apparent density is 1.0 g/m$^3$ or less, gas or liquid permeability can be improved. The apparent density is more preferably 0.15 to 0.9 g/m$^3$, further preferably 0.2 to 0.8 g/cm$^3$. Here, the apparent density is a value obtained by dividing a basis weight by a thickness.

[Non-Through Pore]

The carbon fiber nonwoven fabric of the present invention is one on a surface of which a plurality of non-through pores each having an opening area larger than the average pore area of the carbon fiber nonwoven fabric are dispersively formed. The non-through pore is a pore (recess) which has an opening on one surface of the carbon fiber nonwoven fabric, and does not reach the other surface. Here, the average pore area of the carbon fiber nonwoven fabric is an area of a circle having a diameter equal to the above-mentioned average pore diameter of the carbon fiber nonwoven fabric.

The opening area of the non-through pore mentioned in the present invention is an opening area based on the assumption that the non-through pore-formed surface of the carbon fiber nonwoven fabric is trimmed until the carbon fiber nonwoven fabric has a thickness identical to a thickness of the carbon fiber nonwoven fabric in compression of the carbon fiber nonwoven fabric at 1 MPa in the thickness direction (hereinafter, sometimes referred to simply as a "compressed thickness") in order to eliminate the influences of irregularities on a surface of the carbon fiber nonwoven fabric. The compressed thickness is determined by cutting the carbon fiber nonwoven fabric to 2.5 cm×2.5 cm, and sandwiching the carbon fiber nonwoven fabric between metal plates having a surface size of 3 cm or more×3 cm or more and a thickness of 1 cm or more, and applying a pressure of 1 MPa to the carbon fiber nonwoven fabric. The opening area of the non-through pore can be determined by observing a surface of the carbon fiber nonwoven fabric with a laser microscope etc., and measuring the cross-sectional area of each non-through pore at a height equivalent to the compressed thickness using a shape analysis application. When as a result of trimming the non-through pore-formed surface of the carbon fiber nonwoven fabric until the carbon fiber nonwoven fabric has a thickness identical to the compressed thickness, non-through pores are eliminated, or the peripheral edges of the pore can be no longer recognized, it is determined that non-through pores are not formed. When the shape of the non-through pore is mentioned in the following descriptions, it refers to a value for the non-through pore based on the assumption that the non-through pore-formed surface of the carbon fiber nonwoven fabric is trimmed until the carbon fiber nonwoven fabric has the compressed thickness unless otherwise specified.

The pore area of one non-through pore is preferably 1000 µm$^2$ or more, more preferably 2000 µm$^2$ or more for securing drainage performance. For securing the contact area with the separator, and imparting sufficient electrical conductivity and thermal conductivity, the pore area of the non-through pore is preferably 100 mm$^2$ or less, more preferably 10 mm$^2$ or less, further preferably 1 mm$^2$ or less.

The transverse cross-sectional shape of the non-through pore (cross-sectional shape when the non-through pore is cut in the in-plane direction of a surface of the carbon fiber nonwoven fabric) is not particularly limited, and any shape such as a circular shape, an elliptical shape, a tetragonal shape, a triangular shape, a polygonal shape or a star shape can be selected.

The longitudinal cross-sectional shape of the non-through pore (cross-sectional shape when the non-through pore is cut in the perpendicular-to-plane direction of a surface of the carbon fiber nonwoven fabric) is not particularly limited, and it may be a substantially rectangular shape in which the diameter is not changed in the depth direction, a substantially trapezoidal shape, a substantially triangular shape, or a substantially arc shape in which the diameter is changed in the depth direction, but a reverse trapezoidal shape, bow shape or the like in which the diameter decreases as the bottom is approached is preferable because drainage efficiency can be improved. In the non-through pore, the shape of the cross-section in the depth direction is preferably a bow shape in the upper chord from the viewpoint of ease of pore formation. In other words, the non-through pore is preferably a substantially spherical recess.

The depth of the non-through pore area is not particularly limited, but it is preferably 5% or more, more preferably 10% or more of the compressed thickness of the carbon fiber nonwoven fabric for securing drainage performance. The magnitude of the depth of the non-through pore is preferably 5 µm or more, more preferably 10 µm or more, further preferably 15 µm or more.

The upper limit of the depth of the non-through pore is not particularly limited, and can be appropriately determined according to the thickness of the carbon fiber nonwoven fabric, but it is preferably 80% or less, more preferably 50% or less of the compressed thickness of the carbon fiber nonwoven fabric for securing the strength of the carbon fiber nonwoven fabric and maintaining uniformity in gas feeding. Since the general thickness of the carbon fiber nonwoven fabric for a gas diffusion electrode is about 500 µm at a maximum as described above, the depth of the non-through pore is preferably 400 µm or less, more preferably 300 µm or less in conformity with the thickness of the carbon fiber nonwoven fabric. The depth of the non-through pore can be determined in the following manner: a non-through pore is observed with a laser microscope, and using a shape analysis application, a flat surface is assumed, which exists on the opening surface side of the non-through pore at a height, from the non-opening surface, equivalent to the compressed thickness of the carbon fiber nonwoven fabric, and the depth of a portion existing on the non-opening surface side from the flat surface in the non-through pore is measured.

In the carbon fiber nonwoven fabric of the present invention, non-through pores are dispersively formed on at least one surface thereof. The term "dispersively formed" refers to a state in which a plurality of non-through pores are arranged on a surface of the carbon fiber nonwoven fabric while the peripheral edges of openings thereof are not in contact with one another. The arrangement pattern of the non-through pores is not particularly limited, but it is preferable that the non-through pores are substantially uniformly distributed in the surface.

The opening ratio of the non-through pores is preferably 1.5% to 60%. When the opening ratio of the non-through pores is 1.5% or more, sufficient drainage performance can be secured, and when the opening ratio of the non-through pores is 60% or less, excellent electrical conductivity and thermal conductivity can be achieved. The opening ratio of the non-through pores is more preferably 3% or more and 40% or less.

The number of non-through pores per unit area is preferably 30/cm$^2$ to 5000/cm$^2$, more preferably 100/cm$^2$ to 1500/cm$^2$.

The non-through pores in the present invention have an opening peripheral length per unit area of preferably 0.1 to 20 km/m$^2$, more preferably 0.5 to 10 km/m$^2$. When the opening peripheral length is 0.1 km/m$^2$ or more, a high drainage effect is obtained, and when the opening peripheral length is 10 km/m$^2$ or less, a high moisture retention effect is obtained.

The carbon fiber nonwoven fabric of the present invention has no broken fibers observed on the peripheral edge portions of non-through pores in plane view. The carbon fiber nonwoven fabric generally has a gas permeability greater in the surface direction than in the thickness direction. Existence of broken fibers on the peripheral edge portions of non-through pores means that the cross-section of the carbon fiber nonwoven fabric in the thickness direction is exposed at the inner wall portions of the non-through pores, and as a result, moisture retainability in the nonwoven fabric is hard to be maintained. In the carbon fiber nonwoven fabric of the present invention, these broken fibers do not exist, and therefore high moisture retainability can be achieved.

Observation of no broken fibers on the peripheral edge portions of non-through pores can be confirmed by observing a surface of the carbon fiber nonwoven fabric with an optical microscope, an electron microscope or the like, and finding that on the periphery of each non-through pore, a carbon fiber which is oriented from the outside to the inside of the non-through pore and broken off on the peripheral edge portion of the non-through pore is not observed. Here, it is most desirable that the carbon fiber nonwoven fabric of the present invention have no broken fibers observed on the peripheral edge portions of any non-through pores observed. However, it is evident that when a large number of non-through pores are formed, the effect of the present invention can be exhibited even if not all non-through pores are a non-through pore having no broken fibers on the peripheral edge portion thereof. Accordingly, in the present invention, in the case where the number of non-through pores having no broken fibers observed on the peripheral edge portions thereof is larger than the number of non-through pores having broken fibers observed on the peripheral edge portions thereof, it is determined that "no broken fibers are observed on the peripheral edge portions of non-through pores." There may be a case where the broken parts of broken fibers cannot be accurately distinguished from the end parts of fibers that are not broken, and in this case, presence/absence of broken fibers is determined, for convenience, with the latter included in the former.

Non-through pores having no broken fibers observed on the peripheral edge portions thereof constitute preferably 70% or more, more preferably 80% or more, further preferably 90% or more of all the non-through pores. A considerably large number of non-through pores are usually formed, and therefore in the present invention, when 20 or more neighboring non-through pores are observed, and it is found that more than half of the non-through pores have no broken fibers observed on the peripheral edge portions, it is determined that the number of non-through pores having no broken fibers observed on the peripheral edge portions thereof is larger than the number of non-through pores having broken fibers observed on the peripheral edge portions thereof.

In the carbon fiber nonwoven fabric of the present invention, it is preferable that carbon fibers bent substantially along the shape of the peripheral edge of the non-through pore exist on the peripheral edge portions of the non-through pores or in the vicinity thereof in plane view. With this configuration, moisture permeability at the wall surface of the non-through pore is further reduced, so that moisture retainability in the nonwoven fabric is further improved.

Figure 1:
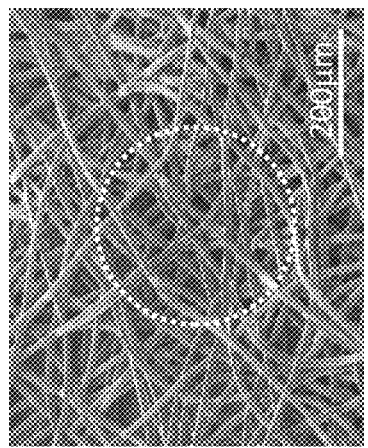
FIG. 1 is a scanning electron microscope photograph of a surface of a carbon fiber nonwoven fabric of the present invention prepared in Example 1.

The above-mentioned structure of the carbon fiber nonwoven fabric of the present invention is shown in, for example, the scanning electron microscope photograph of FIG. 1. In FIG. 1, the dotted line part shows the peripheral edge portion of the non-through pore.

In the carbon fiber nonwoven fabric of the present invention, it is preferable that at least some of carbon fibers that form the wall surface of the non-through pore are oriented in the height direction of the non-through pore. The carbon fiber that forms the wall surface of the non-through pore is a carbon fiber which is at least partially exposed to the inner wall surface of the non-through pore. The phrase "the carbon fiber is oriented in the height direction of the non-through pore" means that when the non-through pore is divided into three equal parts in the height direction, the carbon fiber extends through both two dividing surfaces (flat surfaces parallel to the surface of the carbon fiber nonwoven fabric).

Existence of a carbon fiber oriented in the height direction of the non-through pore can be confirmed by observing a surface of the carbon fiber nonwoven fabric with a laser microscope etc., and using a shape analysis application to find that a carbon fiber is observed, which intersects both of an intersection line between a dividing surface at one-third of the depth of the non-through pore and the inner wall surface of the non-through pore and an intersection line between a dividing surface at two-thirds of the depth of the non-through pore and the inner wall surface of the non-through pore. Existence of such a carbon fiber can also be confirmed by observing any cross-section of the carbon fiber nonwoven fabric, which includes a non-through pore, with a scanning electron microscope etc., drawing two straight lines which intersect the non-through pore at one-third and at two-thirds, respectively, of the depth of the non-through pore and are parallel to the carbon fiber nonwoven fabric, and then finding that a carbon fiber is observed, which intersects both of the two straight lines. The number of such carbon fibers existing in one non-through pore is preferably 2 or more, further preferably 5 or more.

Generally, when pores are formed, the contact area with a member (e.g. separator) on the gas feeding side decreases as compared to a case where pores are not formed, and thus electrical conductivity and thermal conductivity are deteriorated. However, carbon fibers have higher electrical conductivity and thermal conductivity in the fiber axis direction than the fiber cross-section direction, and therefore when carbon fibers that form the wall surface of the non-through pore are oriented in the height direction of the non-through pore, electrical conductivity and thermal conductivity of the carbon fiber nonwoven fabric in the thickness direction can be improved to compensate for deterioration of electrical conductivity and thermal conductivity due to pore formation.

Preferably, the carbon fiber extends through all of three dividing surfaces when the non-through pore is divided in four equal parts in the height direction, and more preferably, the carbon fiber extends through all of four dividing surfaces when the non-through pore is divided into five equal parts. Preferably, at least some of carbon fibers that form the wall surface of the non-through pore continuously extend along the wall surface at least from the opening of the non-through pore to the bottom.

It is preferable that carbon fibers oriented in the height direction of the non-through pore continuously extend to the bottom surface of the non-through pore because the effect of improving electrical conductivity and thermal conductivity in the height direction of the non-through pore is increased. The phrase "the carbon fiber continuously extends to the bottom surface of the non-through pore" refers to a state in which a tip, on the carbon fiber nonwoven fabric bottom surface side, of the carbon fiber that forms the wall surface of the non-through pore is bent or curved, so that at least a part of the carbon fiber is exposed to the bottom surface of the non-through pore. When the wall surface cannot be distinguished from the bottom surface in the non-through pore because, for example, the non-through pore is spherical, the deepest part of the non-through pore is considered as a bottom surface. It is preferable that in observation of a cross-section of the carbon fiber nonwoven fabric, at least some of carbon fibers that form one wall surface of the non-through pore continuously extend to the bottom surface of the non-through pore, and further form another wall surface. In other words, it is preferable that there exists a carbon fiber which forms the wall surface at two locations in the non-through pore, and continuously extends to the bottom surface.

[Microporous Layer]

When the carbon fiber nonwoven fabric of the present invention is used as a gas diffusion electrode, it is preferable that a microporous layer is formed on a surface of the carbon fiber nonwoven fabric which is not provided with non-through pores (surface on the electrolyte membrane side). Owing to the microporous layer, liquid water is eliminated from between the catalyst layer and the gas diffusion electrode to suppress flooding, and reverse diffusion of moisture to the electrolyte membrane is promoted to wet the electrolyte membrane, so that an effect of suppressing drying-up is obtained.

The microporous layer is preferably a layer containing linear carbon material. Studies by the present inventors have shown that higher performance is achieved when a microporous layer is formed by applying linear carbon material in a carbon fiber nonwoven fabric provided with voids and pores than a case of applying particulate carbon. There may be several reasons for this, and one of the reasons may be that in a microporous layer including particulate carbon, a resin tends to flow into voids between carbon fibers to fill the voids. On the other hand, when the microporous layer contains linear carbon material, this problem can be solved.

Examples of the linear carbon material include vapor phase growth carbon fibers, single-walled carbon nanotubes, double-walled carbon nanotubes, multiwalled carbon nanotubes, carbon nanohorns, carbon nanocoils, cup-laminated carbon nanotubes, bamboo-like carbon nanotubes and graphite nanofibers. Among them, a plurality of types of linear carbon materials may be used in combination. Among them, vapor phase growth carbon fibers, single-walled carbon nanotubes, double-walled carbon nanotubes and multiwalled carbon nanotubes are preferred because the aspect ratio can be increased, leading to excellent electrical conductivity and thermal conductivity. It is considered that by using the linear carbon material, a carbon coating solution that is a precursor of the microporous layer is properly inhibited from penetrating into the carbon fiber nonwoven fabric, and closing of voids in the carbon fiber nonwoven fabric is suppressed to improve gas diffusibility and drainage performance in the in-plane direction. Generally, carbon fibers have an average diameter of 3 µm or more, and an average fiber length of 1 mm or more although depending on the cut length, and are discriminated form the linear carbon material in this specification.

Preferably, the linear carbon material has an average diameter of 0.1 to 1000 nm and an average fiber length of 1 to 1000 µm. Gas phase growth carbon fibers having an average diameter of 5 to 200 nm and an average fiber length of 1 to 20 µm are especially preferable.

The aspect ratio of the linear carbon material is preferably 30 to 5000. When the aspect ratio of the linear carbon material is 30 or more, penetration of a carbon coating solution into the carbon fiber nonwoven fabric and closing of voids can be further suppressed due to entanglement of linear carbon material in the carbon coating solution. When the aspect ratio of the linear carbon material is 5000 or less, aggregation and segmentation of a solid in the carbon coating solution can be suppressed to conduct production more stably. In the present invention, the aspect ratio of the linear carbon material is more preferably 3000 or less, further preferably 1000 or less. The aspect ratio of the linear carbon material is more preferably 35 or more, further preferably 40 or more.

Here, the aspect ratio of the linear carbon material means an average length (µm)/average diameter (µm). The average length is obtained by taking a picture with an object magnified by a factor of 1000 or more using a microscope such as a scanning electron microscope or a transmission electron microscope, randomly selecting 10 linear carbon fibers, measuring the lengths thereof, and determining an average of the measured lengths. The average diameter is obtained by taking a picture with an object magnified by a factor of 10000 or more using a microscope such as a scanning electron microscope or a transmission electron microscope, randomly selecting 10 different linear carbon fibers, measuring the diameters thereof, and determining an average of the measured diameters. As the scanning electron microscope, S-4800 manufactured by Hitachi, Ltd. or its equivalent can be used.

In the present invention, the average length of the linear carbon material is preferably in the range of 0.1 to 30 µm, more preferably in the range of 1 to 20 µm, further preferably in the range of 2 to 15 µm. When the average length of the linear carbon material is 0.1 µm or more, the viscosity of the carbon coating solution further increases, so that an effect of, for example, suppressing strike-through and closing of recesses and voids is exhibited to further improve gas diffusibility and drainage performance of the carbon fiber nonwoven fabric in the in-plane direction.

The microporous layer containing linear carbon material may further contain various kinds of carbon-based fillers other than linear carbon material. Examples of the carbon-based filler include carbon blacks such as furnace black, acetylene black, lamp black and thermal black, scaley graphite, scale-like graphite, earthy graphite, artificial graphite, expanded graphite and thin graphite.

When carbon black is used as the carbon-based filler, the mixing mass ratio of carbon black to linear carbon material is preferably in the range of 0.5 to 20, more preferably in the range of 1 to 19, further preferably in the range of 2 to 10. When the above-mentioned mixing mass ratio is 0.5 or more, the microporous layer containing linear carbon material and carbon black has a more proper void content, and therefore water vapor diffusibility is further reduced, so that drying-up can be further suppressed. When the above-mentioned mixing mass ratio is 20 or less, a carbon coating solution that is a precursor of the microporous layer is properly inhibited from penetrating into the carbon fiber nonwoven fabric by the effect of blending linear carbon material having a specific aspect ratio, and thus gas diffusibility and drainage performance in the in-plane direction are improved, so that flooding can be suppressed, and further, a microporous layer having a sufficient thickness is formed on a surface of the carbon fiber nonwoven fabric to promote reverse diffusion of generated water.

Preferably, the microporous layer contains a hydrophobic agent for promoting drainage of liquid and water. Particularly, it is preferable to use a fluorine-based polymer as the hydrophobic agent because it is excellent in corrosion resistance. Examples of the fluorine-based polymer include polytetrafluoroethylene (PTFE), tetrafluoroethylene-hexafluoropropylene copolymers (FEPs) and tetrafluoroethylene-perfluoroalkyl vinyl ether copolymers (PFAs).

The void content of the microporous layer is preferably in the range of 60 to 85%, more preferably in the range of 65 to 80%, further preferably in the range of 70 to 75%. When the void content is 60% or more, drainage is further improved, so that flooding can be further suppressed. When the void content is 85% or less, water vapor diffusibility is further reduced, so that drying-up can be further suppressed. In addition, conductivity is improved, resulting in further improvement of power generation performance at either a high temperature or a low temperature. Here, the void content of the microporous layer is obtained by preparing a sample for cross-section observation using an ion beam cross-section processor, taking a picture with the cross-section magnified by a factor of 1000 or more using a microscope such as a scanning electron microscope, measuring the area of void parts, and determining the ratio of the area of the void parts to the observation area. As the scanning electron microscope, S-4800 manufactured by Hitachi, Ltd. or its equivalent can be used.

A microporous layer having such a void content in the above-mentioned range is obtained by controlling, in the method described later, the basis weight of the microporous layer, the blending amount of the carbon-based filler with respect to the hydrophobic agent and other materials, the type of the carbon-based filler and the thickness of the microporous layer. Particularly, it is effective to control the blending amount of the carbon-based filler with respect to the hydrophobic agent and other materials, and the type of the carbon-based filler. Here, a microporous layer having a high void content is obtained by increasing the blending amount of the carbon-based filler with respect to the hydrophobic agent and other materials, and a microporous layer having a low void content is obtained by decreasing the blending amount of the carbon-based filler with respect to the hydrophobic agent and other materials.

The basis weight of the microporous layer is preferably in the range of 10 to 35 g/m$^2$. When the basis weight of the microporous layer is 10 g/m$^2$ or more, a surface of the carbon fiber nonwoven fabric can be more reliably covered, so that reverse diffusion of generated water is further promoted. When the basis weight of the microporous layer is 35 g/m$^2$ or less, closing of recesses and voids is suppressed, so that drainage performance is further improved. The basis weight of the microporous layer is more preferably 30 g/m$^2$ or less, further preferably 25 g/m$^2$ or less. The basis weight of the microporous layer is more preferably 14 g/m$^2$ or more, further preferably 16 g/m$^2$ or more. The basis weight of the carbon fiber nonwoven fabric of the present invention which is provided with the microporous layer is preferably 25 to 185 g/m$^2$.

The preferred thickness of the gas diffusion electrode provided with the microporous layer is the same as the preferred thickness of the carbon fiber nonwoven fabric of the present invention.

The gas permeation resistance in the perpendicular-to-plane direction is used as an index of gas diffusibility in the perpendicular-to-plane direction. The gas diffusibility in the perpendicular-to-plane direction increases as the gas diffusion resistance of the gas diffusion electrode in the perpendicular-to-plane direction decreases. The gas permeation resistance of the gas diffusion electrode provided with a microporous layer, in the perpendicular-to-plane direction, is preferably in the range of 15 to 190 mmAq. When the perpendicular-to-plane gas diffusion resistance is 15 mmAq or more, water vapor diffusibility is further reduced, so that drying-up can be further suppressed. When the perpendicular-to-plane gas diffusion resistance is 190 mmAq or less, gas diffusibility in the perpendicular-to-plane direction is further improved, so that high power generation performance is more easily exhibited over a wide temperature range from a low temperature to a high temperature. The gas permeation resistance in the perpendicular-to-plane direction is more preferably 180 mmAq or less, further preferably 170 mmAq or less. The gas permeation resistance in the perpendicular-to-plane direction is more preferably 25 mmAq or more, further preferably 50 mmAq or more. The gas permeation resistance in the perpendicular-to-plane direction is a value determined in the following manner: a circular sample having a diameter of 4.7 cm is cut out from a gas diffusion electrode provided with a microporous layer, air is caused to pass from a surface on the microporous layer side to the opposite surface at a flow rate of 58 cc/min/cm$^2$, and a differential pressure between the surface on the microporous layer side and the opposite surface at this time is measured using a differential pressure gauge.

Preferably, a part or the whole of the microporous layer penetrates into the carbon fiber nonwoven fabric main body because the electric resistance between the separator and the gas diffusion electrode can be reduced.

<Carbon Fiber Precursor Fiber Nonwoven Fabric>

The carbon fiber nonwoven fabric of the present invention is obtained by carbonizing a carbon fiber precursor fiber nonwoven fabric by firing etc. The structure of the nonwoven fabric is not basically changed through carbonization, and therefore for obtaining the carbon fiber nonwoven fabric of the present invention, it is preferable to use a carbon fiber precursor fiber nonwoven fabric with carbon fibers replaced by carbon fiber precursor fibers before firing in the above-mentioned carbon fiber nonwoven fabric, i.e. a carbon fiber precursor fiber nonwoven fabric on a surface of which a plurality of non-through pores each having an opening area larger than the average pore area of the carbon fiber precursor fiber nonwoven fabric are dispersively formed, the carbon fiber precursor fiber nonwoven fabric having no broken fibers observed on the peripheral edge portions of non-through pores in plane view.

<Method for Producing Carbon Fiber Nonwoven Fabric>

As one example, the carbon fiber nonwoven fabric of the present invention can be produced by a method for producing a carbon fiber nonwoven fabric, including: a step A of pressing a surface of a carbon fiber precursor fiber nonwoven fabric to form non-through pores therein; and a step B of carbonizing the carbon fiber precursor fiber nonwoven fabric prepared in the step A.

[Carbon Fiber Precursor Fiber Nonwoven Fabric]

The carbon fiber precursor fiber is a fiber which is formed into a carbon fiber by carbonization, and it is preferably a fiber having a carbonization ratio of 15% or more, more preferably a fiber having a carbonization ratio of 30% or more. The carbon fiber precursor fibers for use in the present invention are not particularly limited, and examples thereof include polyacrylonitrile (PAN)-based fibers, pitch-based fibers, lignin-based fibers, polyacetylene-based fibers, polyethylene-based fibers, fibers obtained by infusibilizing these fibers, polyvinyl alcohol-based fibers, cellulose-based fibers and polybenzoxazole-based fibers. Among them, PAN-based flameproof fibers obtained by infusibilizing PAN having high strength elongation and satisfactory processability are especially preferably used. The fibers may be infusibilized either before or after preparation of a nonwoven fabric, but it is preferable to infusibilize the fibers before they are formed into a sheet because an infusibilization treatment is easily uniformly controlled. When a carbon fiber precursor fiber nonwoven fabric which is not infusibilized is used, an infusibilization treatment can be performed after the later-described step A, but it is preferable to subject the infusibilized carbon fiber precursor fiber nonwoven fabric to the step A for minimizing deformation in the step A. The carbonization ratio can be determined from the following equation.

carbonization ratio (%)=weight after carbonization/ weight before carbonization×100

The carbon fiber precursor fiber nonwoven fabric is a web or a sheet formed of carbon fiber precursor fibers. As the web, a dry parallel laid web or cross laid web, an air laid web, a wet web made by a papermaking process, a spunbond web made by an extrusion method, a melt-blown web or a web made by electrospinning can be used. As the sheet, for example, a sheet obtained by mechanically entangling the webs, a sheet obtained by heating and welding the webs, or a sheet obtained by bonding the webs with a binder. When PAN-based fibers prepared in a solution spinning method are infusibilized and formed into a web, a dry web or a wet web is preferable because a uniform sheet is easily obtained, and particularly, a sheet obtained by mechanically entangling dry webs is preferable because shape stability in the steps is easily secured.

Preferably, the carbon fiber precursor fibers include a curved part having a curvature radius of 1 mm or less in the carbon fiber precursor fiber nonwoven fabric for imparting high electrical conductivity and thermal conductivity to the carbon fiber nonwoven fabric after carbonization. The carbon fiber precursor fiber nonwoven fabric is more preferably one including a curved part having a curvature radius of 500 µm or less, further preferably one including a curved part having a curvature radius of 200 µm or less. Specifically, when an area of 1.5 mm×1.5 mm of a surface of the carbon fiber precursor fiber nonwoven fabric is observed with an optical microscope or an electron microscope, preferably 10 or more, more preferably 30 or more carbon fiber precursor fibers including a curved part having a curvature radius as described above can be found. When an area of 1.5 mm×1.5 mm of a surface of the carbon fiber precursor fiber nonwoven fabric is observed with an optical microscope or an electron microscope, and this visual filed is divided into 25 regions each having a size of 0.3 mm×0.3 mm, the number of regions where the curved part having a curvature radius as described above can be found is preferably 5 or more, more preferably 10 or more.

Examples of the method for preparing a carbon fiber precursor fiber nonwoven fabric containing carbon fiber precursor fibers including a curved part having a curvature radius of 1 mm or less include a method in which a nonwoven fabric is formed by using carbon fiber precursor fibers crimped beforehand by, for example, a press-in type crimper (provided with a stuffing box), and a method in which a web is prepared from carbon fiber precursor fibers, and the fibers are then entangled and bent by a mechanical treatment such as needle punching or water jet punching. More preferable is a method of using a carbon fiber precursor fiber nonwoven fabric prepared by subjecting a web, which is obtained by crimping the fibers, to a needle punching treatment or water jet punching treatment.

Since the carbon fiber nonwoven fabric is excellent in electrical conductivity and thermal conductivity when a carbide is deposited at an intersection of carbon fibers in the carbon fiber nonwoven fabric as described above, the carbon fiber precursor fiber nonwoven fabric is preferably one containing a binder. The method for including a binder in the carbon fiber precursor fiber nonwoven fabric is not particularly limited, and examples thereof include a method in which the carbon fiber precursor fiber nonwoven fabric is impregnated or sprayed with a binder solution, and a method in which thermoplastic resin fibers serving as a binder are mixed in the carbon fiber precursor fiber nonwoven fabric beforehand.

When the carbon fiber precursor fiber nonwoven fabric is impregnated or sprayed with a binder solution, a thermosetting resin such as a phenol resin, an epoxy resin, a melamine resin or a furan resin can be used as a binder, and a phenol resin is preferable because it has a high carbonization yield. However, when the carbon fiber precursor fiber nonwoven fabric is impregnated with a binder resin solution, there arises a difference in shrinkage behavior between the carbon fiber precursor fiber nonwoven fabric and the binder resin in the carbonization step, so that smoothness of the carbon fiber nonwoven fabric is easily deteriorated, and a migration phenomenon easily occurs in which a solution moves to a surface of the carbon fiber nonwoven fabric at the time of drying the binder, so that a uniform treatment tends to be difficult.

On the other hand, the method in which thermoplastic resin fibers serving as a binder are mixed in the carbon fiber precursor fiber nonwoven fabric beforehand is the most preferred method because the ratio of the carbon fiber precursor fibers to the binder resin can be made uniform in the nonwoven fabric, and a difference in shrinkage behavior between the carbon fiber precursor fiber and the binder resin is hard to arise. The thermoplastic resin fibers are preferably polyester fibers, polyamide fibers and polyacrylonitrile fibers which are relatively inexpensive.

The blending amount of the binder is preferably 0.5 parts by mass or more, more preferably 1 part by mass or more based on 100 parts by mass of carbon fiber precursor fibers for improving the strength, electrical conductivity and thermal conductivity of the carbon fiber nonwoven fabric. The blending amount of the binder is preferably 80 parts by mass or less, more preferably 50 parts by mass or less for improvement of drainage performance.

The binder can also be added by impregnating or spraying the carbon fiber precursor fiber nonwoven fabric with a binder solution after formation of non-through pores in the carbon fiber precursor fiber nonwoven fabric in the later-described step A. The binder can also be added through a step of impregnating or spraying with a binder solution the carbon fiber nonwoven fabric having carbonization performed thereon in the later-described step B, and performing carbonization again. However, when the binder is added after formation of non-through pores, the binder solution tends to pool on the peripheries of the pores to make the deposition amount uneven, and therefore it is preferable to add the binder before formation of non-through pores.

For improving electrical conductivity, it is further preferable to add an electrical conductive aid to thermoplastic resin fibers serving as a binder, or a solution for impregnation or spraying. As the electrical conductive aid, carbon black, carbon nanotubes, carbon nanofibers, milled fibers of carbon fibers, graphite and the like can be used.

[Step A] The step A is a step of forming non-through pores on a surface of a carbon fiber precursor fiber nonwoven fabric to prepare a carbon fiber precursor fiber nonwoven fabric having non-through pores. Heretofore, the non-through pores have been generally formed by laser-processing or machine-processing a carbon fiber nonwoven fabric after carbonization, but this method has the problem that electrical conductivity and thermal conductivity are deteriorated because cutting of carbon fibers at the wall surfaces of non-through pores during formation of the pores cannot be avoided.

In the step A, a surface of the carbon fiber precursor fiber nonwoven fabric is pressed to form non-through pores. The pressing method is not particularly limited, and a method in which a shaping member having projections corresponding to non-through pores is pressed against the surface, a method in which the surface is pressed with an acicular member, a method in which the surface is hydraulically pressed, or the like can be used as long as the method causes cutting of carbon fibers.

Particularly preferable is the method in which a shaping member having projections corresponding to non-through pores to be formed is pressed against a surface of the carbon fiber precursor fiber nonwoven fabric. In this method, by physically depressing a part of a surface of the carbon fiber precursor fiber nonwoven fabric with a shaping member, non-through pores can be formed while cutting of carbon fiber precursor fibers is prevented. Accordingly, a carbon fiber precursor fiber nonwoven fabric having no broken fibers observed on the peripheral edge portions of the non-through pores can be obtained.

While more specific means is not particularly limited, embossing is preferable, and examples thereof include a method in which continuous pressing is performed using an embossing roll provided with projection shapes corresponding to non-through pores, and a flat roll, a method in which batch pressing is performed using a plate provided with similar projection shapes, and a flat plate. It is preferable to use a heated roll or plate in pressing so that the shape is not restored (non-through pores are not eliminated) in carbonization in the later-described step B. The heating temperature here is preferably 160° C. to 280° C., more preferably 180° C. to 260° C. from the viewpoint of shape stability of non-through pores formed in the nonwoven fabric structure of carbon fiber precursor fibers.

It is also preferable that pressing with a roll or plate having no projections is performed before or after the step A for controlling the density and thickness of a carbon fiber nonwoven fabric which is finally obtained.

Since it is preferable to deform a carbon fiber precursor fiber nonwoven fabric having a relatively low density for forming non-through pores without causing breakage of fibers, the carbon fiber precursor fiber nonwoven fabric has an apparent density of preferably 0.02 to 0.20 g/cm$^3$, more preferably 0.05 to 0.15 g/cm$^3$ before being subjected to the step A.

The apparent density of the carbon fiber nonwoven fabric to be used in the gas diffusion electrode is preferably 0.20 g/cm$^3$ or more for achieving excellent electrical conductivity and thermal conductivity, and is preferably 1.00 g/cm$^3$ or less for achieving excellent gas diffusibility. For this purpose, the apparent density of the carbon fiber precursor fiber nonwoven fabric is preferably 0.20 to 1.00 g/cm$^3$. For controlling the apparent density of the carbon fiber precursor fiber nonwoven fabric, the apparent density can be adjusted by pressing the carbon fiber precursor fiber nonwoven fabric with a flat roll or a flat plate after the step A is carried out, and it is preferable that in the step A, not only the non-through pore portions but also the whole carbon fiber precursor nonwoven fabric are simultaneously pressed to ensure that the apparent density of the carbon fiber precursor fiber nonwoven fabric is 0.20 to 1.00 g/cm$^3$ for controlling the shape of the non-through pores.

[Step B]

The step B is a step of carbonizing the carbon fiber precursor fiber nonwoven fabric prepared in the step A. The method for carbonization is not particularly limited, and a known method in the field of carbon fiber materials can be used, but firing under an inert gas atmosphere is preferably used. In firing under an inert gas atmosphere, carbonization is preferably performed at 800° C. or higher while an inert gas such as nitrogen or argon is fed. The firing temperature is preferably 1500° C. or higher, more preferably 1900° C. or higher because excellent electrical conductivity and thermal conductivity are easily achieved. On the other hand, the firing temperature is preferably 3000° C. or lower in view of operation costs of a heating furnace.

When the carbon fiber nonwoven fabric is used as a gas diffusion electrode of a polymer electrolyte fuel cell, it is preferable to adjust the shape and carbonization conditions of the carbon fiber precursor fiber nonwoven fabric so that the carbon fiber precursor fiber nonwoven fabric has a thickness of 50 to 400 µm after carbonization.

When the carbon fiber precursor nonwoven fabric is formed of carbon fiber precursor fibers before infusibilization, it is preferable to carryout an infusibilization step before the step B. The infusibilization step is usually carried out at a temperature of 150 to 350° C. for a treatment time of 10 to 100 minutes in the air. In the case of PAN-based infusibilized fibers, it is preferable that the density is set so as to fall within the range of 1.30 to 1.50 g/m$^3$.

[Water-Repellent Processing Step]

In the present invention, it is preferable to subject the carbon fiber nonwoven fabric to water-repellent processing for the purpose of improving drainage performance. Water-repellent processing can be performed by applying a hydrophobic agent to the carbon fiber nonwoven fabric, and heat-treating the hydrophobic agent-applied fabric. Here, it is preferable to use a fluorine-based polymer as the hydrophobic agent because it is excellent in corrosion resistance. Examples of the fluorine-based polymer include polytetrafluoroethylene (PTFE), tetrafluoroethylene-hexafluoropropylene copolymers (FEPs) and tetrafluoroethylene-fluoroalkyl vinyl ether copolymers (PFAs). The application amount of the hydrophobic agent is preferably 1 to 50 parts by mass, more preferably 3 to 40 parts by mass based on 100 parts by mass of the carbon fiber nonwoven fabric. It is preferable that the application amount of the hydrophobic agent is 1 part by mass or more because the carbon fiber nonwoven fabric is excellent in drainage performance. On the other hand, it is preferable that the application amount of the hydrophobic agent is 50 parts by mass or less because the carbon fiber nonwoven fabric is excellent in electrical conductivity.

[Microporous Layer Forming Step]

By applying a carbon coating solution, which contains particulate carbon or linear carbon material, to one surface of the carbon fiber nonwoven fabric prepared in the manner described above, a microporous layer can be formed.

The carbon coating solution may contain a dispersion medium such as water or an organic solvent, and may contain a dispersion aid such as a surfactant. Water is preferable as the dispersion medium, and a nonionic surfactant is preferably used as the dispersion aid. The carbon coating solution may further contain a hydrophobic agent.

The carbon coating solution can be made to contain a vanishing material for the purpose of increasing the fine pore diameter to promote drainage of liquid and water. Here, the vanishing material means a material which, when heated, is dissolved or decomposed to vanish, leading to formation of voids. Specific examples of the vanishing material include particles and fibers of polymethyl methacrylate, polystyrene and so on.

The carbon coating solution can be applied to the carbon fiber nonwoven fabric using various kinds of commercially available coating apparatuses. As a coating method, screen printing, rotary screen printing, spraying, intaglio printing, gravure printing, die coater coating, bar coating, blade coating or the like can be used. The coating methods shown above as an example are illustrative only, and the coating method is not necessarily limited thereto.

It is preferable that after the carbon coating solution is applied to the carbon fiber nonwoven fabric, the coating solution is dried at a temperature of 80 to 120° C. Specifically, the coated product is put in a drier set at a temperature of 80 to 120° C., and dried for 5 to 30 minutes. The drying air amount may be appropriately determined, but rapid drying is not desirable because generation of very small cracks on the surface may be induced.

Further, it is preferable that the coated product is heated at a temperature equal to or higher than the melting point of the hydrophobic agent to increase contacts between hydrophobic agents, so that an effect as a binder is obtained. In the case where PTFE is used as the hydrophobic agent, the coated product is heated at about 350° C. When a vanishing agent is used, it is preferable to vanish the vanishing agent by the heating.

EXAMPLES

Physical properties in examples were measured by the following methods.

1. Structure of Carbon Fiber Nonwoven Fabric
(1) Average Pore Diameter

The average pore diameter was measured using PoreMaster (manufactured by Quantachrome Instruments), and calculated while the surface tension a of mercury was set to 480 dyn/cm and the contact angle between mercury and the carbon fiber nonwoven fabric was set to 140°.

(2) Basis Weight

A square test piece of 10 cm×10 cm was taken, and the weight of the test piece was measured, and divided by the area thereof to determine a basis weight.

(3) Thickness

In a DIGIMICRO MFC-101 (manufactured by Nikon Corporation), a weight of 185 g was applied to a measurement terminal section, the thickness was measured at nine spots of the sample with a $\phi$5 mm terminal, and the average thereof was defined as a thickness.

(4) Fiber Length

The extension and shrinkage in each step were calculated on the basis of the length of cut fibers in production to determine a fiber length of fibers that formed the carbon fiber nonwoven fabric.

2. Non-Through Pore
(1) Presence/Absence of Non-Through Pores

An observation was made with an optical microscope to check whether non-through pores were formed.

(2) Presence/Absence of Broken Fibers on Peripheral Portion of Non-Through Pore

When with a scanning electron microscope, more than half of 20 or more observed neighboring non-through pores were found to have no broken fibers on their peripheral edge portions, it was determined that there were no broken fibers.

(3) Opening Peripheral Length Per Unit Area

An area of 1 mm×1.4 mm was observed with a laser microscope (VK-9710 manufactured by KEYENCE CORPORATION), and examined using a shape analysis application (VK-Analyzer Plus manufactured by KEYENCE CORPORATION). A carbon fiber nonwoven fabric cut to 2.5 cm×2.5 cm was sandwiched between metal plates having a surface size of 3 cm×3 cm and a thickness of 1 cm, a pressure of 1 MPa was applied to the carbon fiber nonwoven fabric to determine a thickness, all pore peripheral lengths at this thickness were measured, and a product of the average thereof and the number of pores per unit area as described later was defined as an opening peripheral length per unit area.

(4) Number of Pores Per Unit Area

An observation was made with an optical microscope to measure the number of non-through pores per unit area.

(5) Orientation of Carbon Fiber in Height Direction on Wall Surface of Non-Through Pore An observation was made with a laser microscope (VK-9710 manufactured by KEYENCE CORPORATION), and a shape analysis application (VK-Analyzer Plus manufactured by KEYENCE CORPORATION) was used to determine whether a carbon fiber that formed the wall surface of the non-through pore was oriented in the height direction of the non-through pore. When a visual field of 1000 μm×1400 μm was observed, and it was found that there is observed at least one carbon fiber intersecting both of an intersection line between a dividing surface at one-third of the depth of the non-through pore and the inner wall surface of the non-through pore and an intersection line between a dividing surface at two-thirds of the depth of the non-through pore and the inner surface of the non-through pore, it was determined that a fiber oriented in the height direction of the non-through pore existed.

3. Power Generation Performance

A catalyst layer formed of platinum-carrying carbon and Nafion (amount of platinum: 0.2 mg/cm$^2$) was bonded to both surfaces of a fluorine-based electrolyte membrane Nafion 212 (manufactured by E. I. du Pont de Nemours and Company) by hot pressing to prepare a catalyst layer-covered electrolyte membrane (CCM). A gas diffusion electrode was disposed on both surfaces of the CCM, and hot pressing was performed again to obtain a membrane electrode assembly (MEA). The MEA with a gasket (thickness: 70 μm) disposed on the periphery of the gas diffusion electrode was set in a single cell (5 cm$^2$, serpentine passage) manufactured by ElectroChem, Inc. Here, a surface coated with a fluorine-based resin (PTFE) and a conductive aid (carbon black) for the gas diffusion electrode faced the MEA side.

(1) Voltage Under Humidified Condition

The cell temperature was 60° C., the dew point of hydrogen and air was 60° C., the flow rates of hydrogen and air were 1000 cc/minute and 2500 cc/minute, respectively, the gas outlet was opened (not compressed), power was generated at a current density of 0.6 A/cm², and the voltage at this time was defined as a voltage under a high-humidified condition.

(2) Voltage Under Low-Humidified Condition

The cell temperature was 60° C., the dew point of hydrogen and air was 40° C., the flow rates of hydrogen and air were 100 cc/minute and 250 cc/minute, respectively, the gas outlet was opened (not compressed), power was generated at a current density of 0.6 A/cm², and the voltage at this time was defined as a voltage under a low-humidified condition.

Example 1

A PAN-based flameproof crimped thread with a fiber diameter of 14 μm was cut to a number average fiber length of 51 mm, and formed into a sheet with a carding and cross-layering, and the sheet was then needle-punched with a needle density of 500/cm² to prepare a carbon fiber precursor fiber nonwoven fabric having an apparent density of 0.10 g/cm³.

One surface of the carbon fiber precursor fiber nonwoven fabric was embossed using a metallic flat roll, and a metallic embossing roll with a circular dot pattern in which cylindrical projections each having a diameter of 150 μm and a height of 150 μm were dispersively formed, the pitch of the projection was 0.50 mm in both MD and CD, and the ratio of the area of the projections to the area of the carbon fiber precursor fiber nonwoven fabric was 7.1%. The heating temperature of the embossing roll and the flat roll was 220° C., the linear pressure was 50 kN/m, and the processing speed was 50 cm/minute. The apparent density after embossing was 0.40 g/m³.

Thereafter, the carbon fiber precursor fiber nonwoven fabric was heated to 1500° C. from room temperature over 3 hours, and heated at 1500° C. for 15 minutes to be carbonized under a nitrogen atmosphere, thereby preparing a carbon fiber nonwoven fabric having non-through pores. The surface of the carbon fiber nonwoven fabric was observed with an electron microscope to show that there were no broken fibers on the peripheral edge portions of the non-through pores. A plane-view image of the carbon fiber nonwoven fabric prepared in Example 1 is shown in FIG. 1.

The carbon fiber nonwoven fabric was impregnated with PTFE in such a manner that the deposition amount in terms of a solid content was 5%, and the carbon fiber nonwoven fabric was dried and subjected to a hydrophobic treatment. Further, a paste containing acetylene black "DENKA BLACK" (registered trademark) (manufactured by Denki Kagaku Kogyo K.K.; average particle size: 0.035 μm; aspect ratio: 1, a type of carbon black; written as AB) and PTFE at a weight ratio of 1:1 was applied to a smooth surface (surface which was not provided with non-through pores), dried, and then heat-treated at 380° C. for 15 minutes to form a microporous layer of 20 g/m², thereby preparing a gas diffusion electrode formed of a carbon fiber nonwoven fabric. Using the gas diffusion electrode, a power generation performance test was conducted in accordance with the procedure in "3. Power generation performance."

Example 2

One surface of a carbon fiber precursor fiber nonwoven fabric prepared in the same manner as in Example 1 was embossed using a metallic flat roll, and a metallic embossing roll with a square dot pattern in which parallelepiped-shaped projections each having a side length of 300 μm and a height of 150 μm were dispersively formed, the pitch of the projection was 0.42 mm in both MD and CD, and the ratio of the area of the projections to the area of the carbon fiber precursor fiber nonwoven fabric was 50.0%. The heating temperature of the embossing roll and the flat roll was 250° C., the linear pressure was 50 kN/m, and the processing speed was 50 cm/minute. The apparent density after embossing was 0.40 g/m³.

Thereafter, the carbon fiber precursor fiber nonwoven fabric was heated to 1500° C. from room temperature over 3 hours, and heated at 1500° C. for 15 minutes to be carbonized under a nitrogen atmosphere, thereby preparing a carbon fiber nonwoven fabric having non-through pores. The surface of the carbon fiber nonwoven fabric was observed with an optical microscope to show that there were no broken fibers on the peripheral edge portions of the non-through pores. A plane-view image of the carbon fiber nonwoven fabric prepared in Example 2 is shown in FIG. 2.

Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Example 3

A PAN-based flameproof crimped thread was cut to a number average fiber length of 76 mm, and then formed into a sheet by carding and cross-layering, and the sheet was then needle-punched with a needle density of 100/cm² to prepare a carbon fiber precursor fiber nonwoven fabric.

Figure 3:
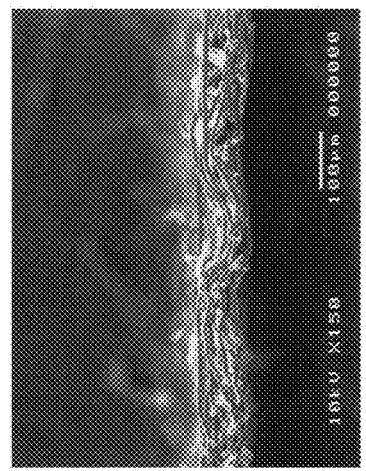
FIG. 3 is a scanning electron microscope photograph of a cross-section of a carbon fiber nonwoven fabric of the present invention prepared in Example 3.

One surface of the carbon fiber precursor fiber nonwoven fabric was embossed in the same manner as in Example 1, and thereafter, the carbon fiber precursor fiber nonwoven fabric was heated to 1500° C. from room temperature over 3 hours, and heated at 1500° C. for 15 minutes to be carbonized under a nitrogen atmosphere, thereby preparing a carbon fiber nonwoven fabric having non-through pores. A cross-sectional image of the carbon fiber nonwoven fabric prepared in Example 3 is shown in FIG. 3.

Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Example 4

Using a PAN-based flameproof thread with a fiber length of 5 mm, a wet nonwoven fabric was prepared by a sheet making method. The wet nonwoven fabric was impregnated with 10% by weight of a phenol resin to prepare a carbon fiber precursor fiber nonwoven fabric having an apparent density of 0.15 g/cm³. Further, the carbon fiber precursor fiber nonwoven fabric was embossed in the same manner as in Example 1 so as to have an apparent density of 0.40 g/cm³, and the same procedure as in Example 1 was carried out to prepare a carbon fiber nonwoven fabric. The surface of the carbon fiber nonwoven fabric was observed with an electron microscope to show that there were no broken fibers on the peripheral edge portions of the non-through pores.

Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Example 5

Except that the basis weight was decreased, the linear pressure in embossing was 5 kN/m, and the apparent density after embossing was 0.14 g/cm$^3$, the same procedure as in Example 1 was carried out to prepare a carbon fiber nonwoven fabric having an apparent density of 0.20 g/cm$^3$. The surface of the carbon fiber nonwoven fabric was observed with an electron microscope to show that there were no broken fibers on the peripheral edge portions of the non-through pores.

Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Example 6

Except that the pitch of the projection was 1 mm in both MD and CD, and the ratio of the area of the projections to the area of the carbon fiber precursor fiber nonwoven fabric was 1.8%, the same procedure as in Example 1 was carried out to prepare a carbon fiber nonwoven fabric. The surface of the carbon fiber nonwoven fabric was observed with an electron microscope to show that there were no broken fibers on the peripheral edge portions of the non-through pores.

Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Example 7

A carbon fiber nonwoven fabric prepared in the same manner as in Example 1 was impregnated with a phenol resin as a binder in such a manner that it was deposited in an amount of 10% by weight in terms of a solid content, the carbon fiber nonwoven fabric was dried, then heated to 1500° C. from room temperature over 3 hours, and heated at 1500° C. for 15 minutes to be carbonized again under a nitrogen atmosphere, thereby preparing a carbon fiber nonwoven fabric. Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Example 8

Except that 80% by weight of a flameproof thread with a fiber length of 51 mm, which was prepared in the same manner as in Example 1, and 20% by weight of a nylon staple with a fiber length of 37 mm were mixed, and the mixture was then subjected to carding and cross-layering and needle-punched with a needle density of 500/cm$^2$ to prepare a carbon fiber precursor fiber nonwoven fabric, the same procedure as in Example 1 was carried out to prepare a carbon fiber nonwoven fabric. Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Example 9

Except that a microporous layer was formed using a paste containing multiwalled carbon nanotubes (manufactured by Cheap Tubes Inc.; average diameter: 0.015 μm; average fiber length: 20 μm; aspect ratio: 1300; a type of linear carbon material; written as CNT) instead of acetylene black and PTFE at a weight ratio of 1:1, the same procedure as in Example 1 was carried out to prepare a carbon fiber nonwoven fabric. Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Example 10

Except that a microporous layer was formed using a paste containing vapor phase growth carbon fibers "VGCF" (registered trademark (manufactured by Showa Denko K.K.; average diameter: 0.15 μm; average fiber length: 8 μm; aspect ratio: 50; a type of linear carbon material; written as VGCF) instead of acetylene black and PTFE at a weight ratio of 1:1, the same procedure as in Example 1 was carried out to prepare a carbon fiber nonwoven fabric. Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Example 11

Except that processing was performed with the basis weight increased by a factor of about 3, the same procedure as in Example 1 was carried out to prepare a carbon fiber nonwoven fabric. Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Example 12

Except that a microporous layer was not formed, the same procedure as in Example 1 was carried out to prepare a gas diffusion electrode. Using the gas diffusion electrode, a power generation performance test was conducted in accordance with the procedure in "3. Power generation performance."

Comparative Example 1

A carbon fiber precursor fiber nonwoven fabric prepared in the same manner as in Example 1 was subjected to press processing using a pair of flat rolls. The heating temperature of the pair of flat rolls was 220° C., the linear pressure was 50 kN/m, and the processing speed was 50 cm/minute. The apparent density after embossing was 0.40 g/m³. Thereafter, the carbon fiber precursor fiber nonwoven fabric was heated at 1500° C. for 15 minutes under a nitrogen atmosphere to be carbonized, thereby preparing a carbon fiber nonwoven fabric. The carbon fiber nonwoven fabric was irradiated with 2 pulses of YAG laser light having a beam diameter of 100 μm, thereby forming non-through pores. The non-through pores were formed at a frequency of one pore per 0.5 mm in both MD and CD. The surface of the carbon fiber nonwoven fabric was observed with an electron microscope to show that a plurality of broken fibers existed on the peripheral edge portions of all the non-through pores.

Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Comparative Example 2

A carbon fiber precursor fiber nonwoven fabric prepared in the same manner as in Example 1 was subjected to press processing using a pair of flat rolls. The heating temperature of the pair of flat rolls was 220° C., the linear pressure was 50 kN/m, and the processing speed was 50 cm/minute. The apparent density after embossing was 0.40 g/m³. Thereafter, the carbon fiber precursor fiber nonwoven fabric was heated at 1500° C. for 15 minutes under a nitrogen atmosphere to be carbonized, thereby preparing a carbon fiber nonwoven fabric. The carbon fiber nonwoven fabric was embossed in the same manner as in Example 1. The surface of the carbon fiber nonwoven fabric was observed with an electron microscope to show that a plurality of broken fibers existed on the peripheral edge portions of all the non-through pores. Subsequently, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

Comparative Example 3

Except that the number of irradiations of YAG laser light was 20 pulses, the same procedure as in Comparative Example 1 was carried out to prepare a carbon fiber nonwoven fabric. Pores formed in the obtained carbon fiber nonwoven fabric were through pores. Subsequently, using the carbon fiber nonwoven fabric, a gas diffusion electrode was prepared by performing a hydrophobic treatment and formation of a microporous layer in the same manner as in Example 1. Using the gas diffusion electrode, a power generation performance test was conducted in accordance with the procedure in "3. Power generation performance."

The configurations of the base materials of the gas diffusion electrodes and the power generation performance of the fuel cells in the examples and the comparative examples are shown in Table 1.

TABLE 1

| | | Example 1 | Example 2 | Example 3 | Example 4 | Example 5 | Example 6 | Example 7 | Example 8 |
|---|---|---|---|---|---|---|---|---|---|
| Carbon fiber nonwoven fabric | Fiber length | 51 mm | 51 mm | 76 mm | 5 mm | 51 mm | 51 mm | 51 mm | 51 mm |
| | Basis weight | 32 g/m² | 47 g/m² | 32 g/m² | 30 g/m² | 20 g/m² | 32 g/m² | 34 g/m² | 32 g/m² |
| | Thickness | 100 μm | 155 μm | 100 μm | 95 μm | 100 μm | 100 μm | 100 μm | 100 μm |
| | Dry/wet | | | Dry | | Wet | | Dry | |
| | Binder | | | | | None | | Phenol resin | Nylon mixture |
| Non-through pore | Formation method | | | Embossing of flameproof thread nonwoven fabric (Non-through pore) | | | | | |
| | Shape in plane view | Circular | Square | | | | Circular | | |
| | Opening peripheral length per unit area | 2.1 km/m² | 7.6 km/m² | | 2.1 km/m² | | 0.5 km/m² | 2.1 km/m² | |
| | Number of pores per unit area | 494/cm² | 700/cm² | | 494/cm² | | 123/cm² | 494/cm² | |
| | Presence/absence of broken fibers on peripheral edge portion | | | | Absent | | | | |
| | Presence/absence of carbon fibers oriented in height direction | | | | Present | | | | |

TABLE 1-continued

| | | | | | | | | | |
|---|---|---|---|---|---|---|---|---|---|
| Microporous layer | Carbon type | AB | | | | | | | |
| Power generation performance | Voltage under humidified condition (V) | 0.50 | 0.53 | 0.50 | 0.45 | 0.50 | 0.45 | 0.47 | 0.49 |
| | Voltage under low-humidified condition (V) | 0.40 | 0.42 | 0.41 | 0.40 | 0.35 | 0.45 | 0.42 | 0.40 |

| | | Example 9 | Example 10 | Example 11 | Example 12 | Comparative Example 1 | Comparative Example 2 | Comparative Example 3 |
|---|---|---|---|---|---|---|---|---|
| Carbon fiber nonwoven fabric | Fiber length | 51 mm | 51 mm | 51 mm | 51 mm | 51 mm | 51 mm | 51 mm |
| | Basis weight | 32 g/m² | 32 g/m² | 95 g/m² | 32 g/m² | 32 g/m² | 32 g/m² | 32 g/m² |
| | Thickness | 100 μm | 100 μm | 300 μm | 100 μm | 100 μm | 100 μm | 100 μm |
| | Dry/wet | Dry | | | | | | |
| | Binder | None | | | | | | |
| Non-through pore | Formation method | Embossing of flameproof thread nonwoven fabric (Non-through pore) | | | | Laser cutting after carbonization (Non-through pore) | Embossing after carbonization (Non-through pore) | Laser cutting after carbonization (Through pore) |
| | Shape in plane view | Circular | | | | | | |
| | Opening peripheral length per unit area | 2.1 k m/m² | | | | 1.4 km/m² | 2.1 km/m² | 1.4 km/m² |
| | Number of pores per unit area | 494/cm² | | | | 494/cm² | 494/cm² | 494/cm² |
| | Presence/absence of broken fibers on peripheral edge portion | Absent | | | | | | Present |
| | Presence/absence of carbon fibers oriented in height direction | Present | | | | | | Absent |
| Microporous layer | Carbon type | CNT | VGCF | AB | — | | AB | |
| Power generation performance | Voltage under humidified condition (V) | 0.55 | 0.54 | 0.42 | 0.42 | 0.36 | 0.35 | 0.45 |
| | Voltage under low-humidified condition (V) | 0.40 | 0.40 | 0.34 | 0.44 | 0.33 | 0.31 | 0.15 |

The invention claimed is:

1. A carbon fiber nonwoven fabric on a surface of which a plurality of non-through pores each having an opening area larger than the average pore area of the carbon fiber nonwoven fabric are dispersively formed, the carbon fiber nonwoven fabric having no broken fibers observed on the peripheral edge portions of the non-through pores, wherein the non-through pores have an opening peripheral length per unit area of 0.1 to 20 km/m² in a planar view.

2. The carbon fiber nonwoven fabric according to claim 1, wherein the number of the non-through pores per unit area is 30/cm² to 5000/cm².

3. The carbon fiber nonwoven fabric according to claim 1, wherein at least some of carbon fibers that form the wall surface of the non-through pore are oriented in the height direction of the non-through pore.

4. The carbon fiber nonwoven fabric according to claim 1, wherein carbon fibers bent substantially along the shape of the peripheral edge of the non-through pore are observed on the peripheral edge portions of the non-through pores or in the vicinity thereof in plane view.

5. A gas diffusion electrode for a polymer electrolyte fuel cell comprising the carbon fiber nonwoven fabric according to claim 1.

6. A gas diffusion electrode for a polymer electrolyte fuel cell in which a microporous layer containing linear carbon material is formed on one surface of the carbon fiber nonwoven fabric according to claim 1.

7. The gas diffusion electrode according to claim 6, wherein the linear carbon material is selected from the group consisting of a vapor phase growth carbon fiber, a single-walled carbon nanotube, a double-walled carbon nanotube, a multiwalled carbon nanotube, a carbon nanohorn, a carbon nanocoil, a cup-laminated carbon nanotube, a bamboo-like carbon nanotube and a graphite nanofiber.

8. A method for producing a carbon fiber nonwoven fabric on a surface of which a plurality of non-through pores each having an opening area larger than the average pore area of the carbon fiber nonwoven fabric are dispersively formed, wherein the carbon fiber nonwoven fabric has no broken fibers observed on the peripheral edge portions of the non-through pores, and wherein the non-through pores have an opening peripheral length per unit area of 0.1 to 20 km/m² in a planar view, the method comprising:
- a step A of pressing a surface of a carbon fiber precursor fiber nonwoven fabric to form non-through pores therein; and
- a step B of carbonizing the carbon fiber precursor fiber nonwoven fabric prepared in the step A so as to produce the carbon fiber nonwoven fabric.

9. A carbon fiber precursor fiber nonwoven fabric on a surface of which a plurality of non-through pores each having an opening area larger than the average pore area of the carbon fiber precursor fiber nonwoven fabric are dispersively formed, the carbon fiber precursor fiber nonwoven fabric having no broken fibers observed on the peripheral edge portions of the non-through pores in a planar view, wherein the non-through pores have an opening peripheral length per unit area of 0.1 to 20 km/m² in a planar view.

* * * * *